US005878471A

United States Patent [19]

Hardy

[11] Patent Number: 5,878,471

[45] Date of Patent: Mar. 9, 1999

[54] DENTAL PRESS APPARATUS

[76] Inventor: Henry R. Hardy, 923 Henderson St., Deltona, Fla. 32725

[21] Appl. No.: 963,045

[22] Filed: Nov. 3, 1997

[51] Int. Cl.[6] .......... B23P 19/02

[52] U.S. Cl. .......... 29/251

[58] Field of Search .......... 29/251, 252, 282, 29/283, 257, 280, 263, 266; 100/288, 266, 237, 193, 295

[56] References Cited

U.S. PATENT DOCUMENTS

| | | | |
|---|---|---|---|
| 535,673 | 3/1895 | Clayton . | |
| 631,894 | 8/1899 | Linkenbach | 269/16 |
| 1,512,422 | 10/1924 | Hatcher et al. | 29/251 |
| 1,544,393 | 6/1925 | Hatcher et al. | 29/251 |
| 1,800,566 | 4/1931 | Pabst . | |
| 2,267,662 | 12/1941 | Miller . | |
| 2,336,262 | 12/1943 | Krasberg . | |
| 2,485,022 | 10/1949 | Taylor . | |
| 2,629,442 | 2/1953 | Veilleux . | |
| 3,512,242 | 5/1970 | Harvis . | |
| 4,065,843 | 1/1978 | Elola . | |
| 4,118,852 | 10/1978 | Schneider . | |
| 4,153,238 | 5/1979 | Tabor | 269/15 |
| 4,305,195 | 12/1981 | Gould . | |
| 4,341,375 | 7/1982 | Romanin | 269/95 |
| 5,519,928 | 5/1996 | Hardy | 29/251 |
| 5,611,132 | 3/1997 | Lacoste | 29/251 |

*Primary Examiner*—Robert C. Watson
*Attorney, Agent, or Firm*—William M. Hobby, III

[57] ABSTRACT

A dental press apparatus for removing and installing a dental handpiece bearings includes a press having a frame having a base with a plurality of apertures therethrough for supporting a dental handpiece thereon and a push plate supported on the frame for pushing against items placed on the press. A spindle ram is attached to the push plate for removing the spindle in a dental handpiece turbine positioned on the base. A bearing ram is attached to the push plate for attaching a bearing to the dental handpiece turbine positioned on the base. A parts tray having an angled surface is removeably supported on the frame below the base for catching a turbine spindle passing through said base aperture after being removed from a dental handpiece turbine, so that a dental handpiece turbine bearing can be rapidly removed and replaced in press. The press includes a removable turbine chuck protector for the spindle ram. The frame has a plurality of suction cups and a drawer built thereinto to hold parts therein. Removable bushings are mounted in aperture in the base to support the turbine during removal and replacement of bearings. A pair of spring loaded push plate guide rods are attached to the base and extend through guide apertures in the push plate.

16 Claims, 4 Drawing Sheets

DENTAL PRESS APPARATUS

BACKGROUND OF THE INVENTION

The present invention relates to a dental press for removing and installing components of a dental highspeed handpiece turbine and especially to a turbine for removing the bearings from a dental handpiece turbine and press fitting new bearings therein.

Dental handpieces are commonly used in connection with dental instruments in the dentist's office and are typically held by the dentist while performing cleaning, drilling or other functions on a patient's teeth. The handpiece has a rotating shaft on one end which has different removable burs for cutting teeth and the like. The handpiece attachments are quickly changed from one to another on the end of the rotating shaft of the handpiece. A dentist's office typically has more than one handpiece for working on patients. Dental handpieces are subject to bearing use and have to be rebuilt or repaired on a regular basis as the bearings wear out. It is common to repair such items by sending them back to the factory for either a new dental handpiece turbine or to rebuild the worn or broke handpiece by removing and replacing the bearings. The bearings are located in the head of the handpiece and are pressed onto a spindle along with an impeller. The spindle, bearings, chuck, and impeller make up the component which the present machine rebuilds and is referred to as the handpiece turbine.

The present invention is for a small hand press having a frame which has a handle driving a gear and rack to actuate the press. A jig is designed to be placed in the press and has a base for supporting the dental handpiece turbine therein and has a push plate slidably mounted over the base and having a pair of rams attached thereon for driving a spindle from the handpiece turbine through an opening in the base plate and a second ram for forcing a new bearing onto the spindle. The press advantageously allows for the alignment of the bearings and the supporting of the inner race of the bearings during the fitting of a new bearing into the handpiece turbine and in the removal of the old bearings. This allows the dentist to replace the bearings in a handpiece in his office at a small expense and thus have the use of the dental handpiece immediately rather than having to send the handpiece back to the factory to have the bearings replaced. This also substantially reduces the cost to the dentist in maintaining his equipment.

Large and small arbor and other types of presses have been common in the prior art including various types of hand presses which use a hand actuated arm rotating a gear to drive a rack, as in the present preferred embodiment. Other types of presses use a handle which acts as a lever arm to gain a mechanical advantage in driving the press while yet others use hydraulic rams to drive the press which rams are actuated by hydraulic pumps. In addition, presses and pin extractors can use a threaded shaft to gain the mechanical advantage of a screw in driving pins or components with a large mechanical force.

Prior art presses or extractors can be seen in my prior U.S. Pat. No. 5,519,928, for a dental press for removing and installing a dental handpiece component including a frame and a driving member supported on the frame and a driving member supported on the frame fro pushing against items placed on the press. The present application is for an improvement to this prior patent. Other prior U.S. patents may be seen in the Pabst patent, U.S. Pat. No. 1,800,566, for an apparatus for removing commutators from armature shafts which uses a press having a hand lever rotating a gear to drive a rack to drive a plunger for removing commutators from the armature shaft. In the Taylor patent, U.S. Pat. No. 2,485,022, a cross-head for presses is for a manually operated arbor press using a threaded driving shaft as a press screw in the press. Similarly, the Maynard patent, U.S Pat. No. 4,977,660, is a tool for removing and installing an automotive universal joint which has a push rod in a press for removing an automotive universal joint. The Gould patent, U.S. Pat. No. 4,305,195, is an apparatus for disassembling and assembling skate wheels which has a pin actuated arm for driving a push/pull member for removing the bearings of a skate wheel and for reinstalling the bearings on the skate wheel. The Schneider patent, U.S. Pat. No. 4,118,852, is for a piston pin remover and installer for use in automobile engine pistons for repair and replacement of a pair of new pins in the piston. The Miller patent, U.S. Pat. No. 2,267,662, is for a press which uses a hydraulic jack for driving a push-type plate against a pair of springs to thereby drive a plunger. The Veilleux patent, U.S. Pat. No. 2,629,442, is a tool for removing rivets and burrs and it has a hand actuating arm driving a cam to thereby drive a plunger. U.S. patents cited in the prior patent include: the Clayton U.S. Pat. No. 535,673 of March 1895 for a Veneer Press; the Krasberg U.S. Pat. No. 2,336,262 of December 1943 for a Pressing Mechanism in a hand press; the Harvis U.S. Pat. No. 3,512,242 of May 1970 for a Pallet Dismantling Apparatus; the Elola U.S. Pat. No. 4,065,843 of January 1978 for Brake Shoe Rivet Removal Press; the Balsano et al U.S. Pat. No. 5,176,922 of January 1993 for a Press for Making Pizza Beds; the Hollnagel U.S. Pat. No. 5,337,656 of August 1994 for Oil Filter Crushing Apparatus Having Air Bag Actuator.

In contrast to this prior art and the many other prior patents for various types of push/pull instruments, the present invention is for a specific press and jig for supporting and removing the bearings from a dental handpiece turbine and for holding a new bearing and reinstalling the bearing onto the handpiece turbine and uses special ram members for supporting and aligning members with the dental handpiece turbine to facilitate the rapid removal and installation of components. Improvements over my prior U.S. Patent includes an improvement to the spindle ram and plate and to the capture of removed spindles and to the storage and positioning of new bearings for the rebuilding of a dental handpiece.

SUMMARY OF THE INVENTION

A dental press apparatus for removing and installing a dental handpiece bearings includes a press having a frame having a base with a plurality of apertures therethrough for supporting a dental handpiece turbine thereon and a push plate supported on the frame for pushing against items placed on the press. A bearing ram is attached to the push plate for attaching a bearing in a dental handpiece turbine positioned on the base. A spindle ram is attached to the push plate for removing the spindle from the dental handpiece turbine positioned on the base. A dental handpiece turbine supporting member is removably attached to the base over an aperture through the base, and has an aperture therethrough sized for a dental handpiece turbine spindle to pass through. A parts tray having an angled surface is removeably supported on the frame below the base for catching a turbine spindle passing through said base aperture after being removed from a dental handpiece turbine, so that a dental handpiece turbine bearing can be rapidly removed and replaced in press. The press includes a removable turbine chuck protector for the spindle ram. The frame has a plurality of suction cups and drawers built thereinto to hold parts therein. Removable bushings are mounted in aperture in the base to support the turbine during replacement of bearings. A pair of spring loaded push plate guide rods are attached to the base and extend through guide apertures in the push plate to guarantee alignment of the rams over the base.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
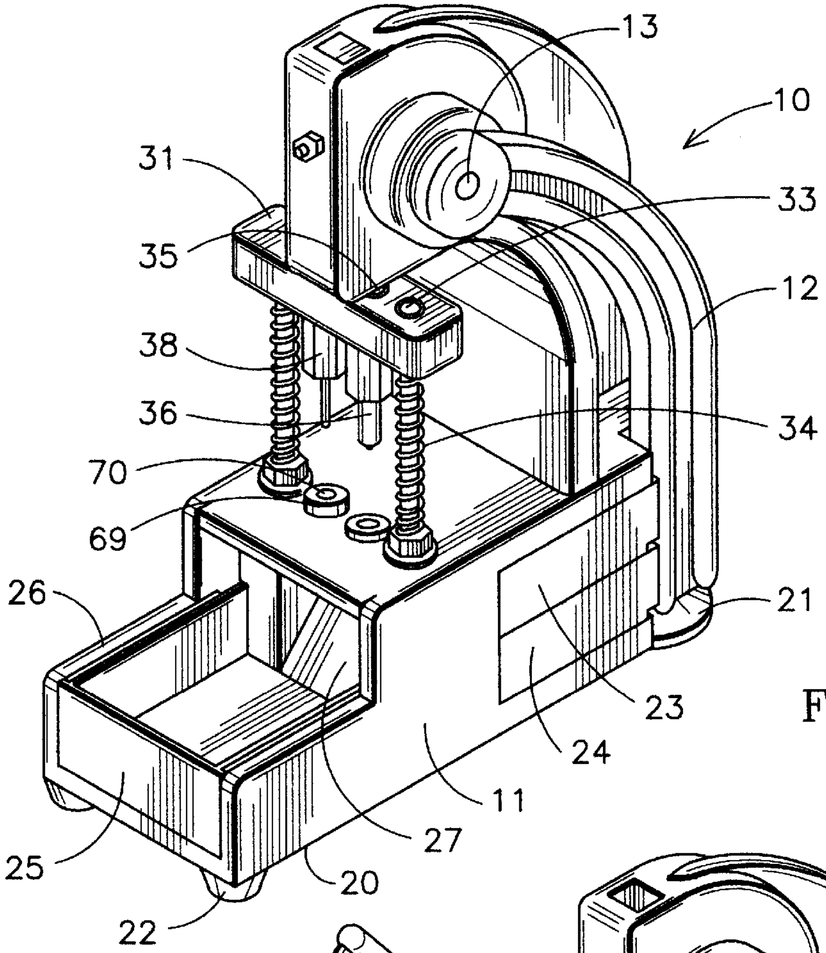
FIG. 1 is a perspective view of a dental press in accordance with the present invention in a rest position.
Figure 2:
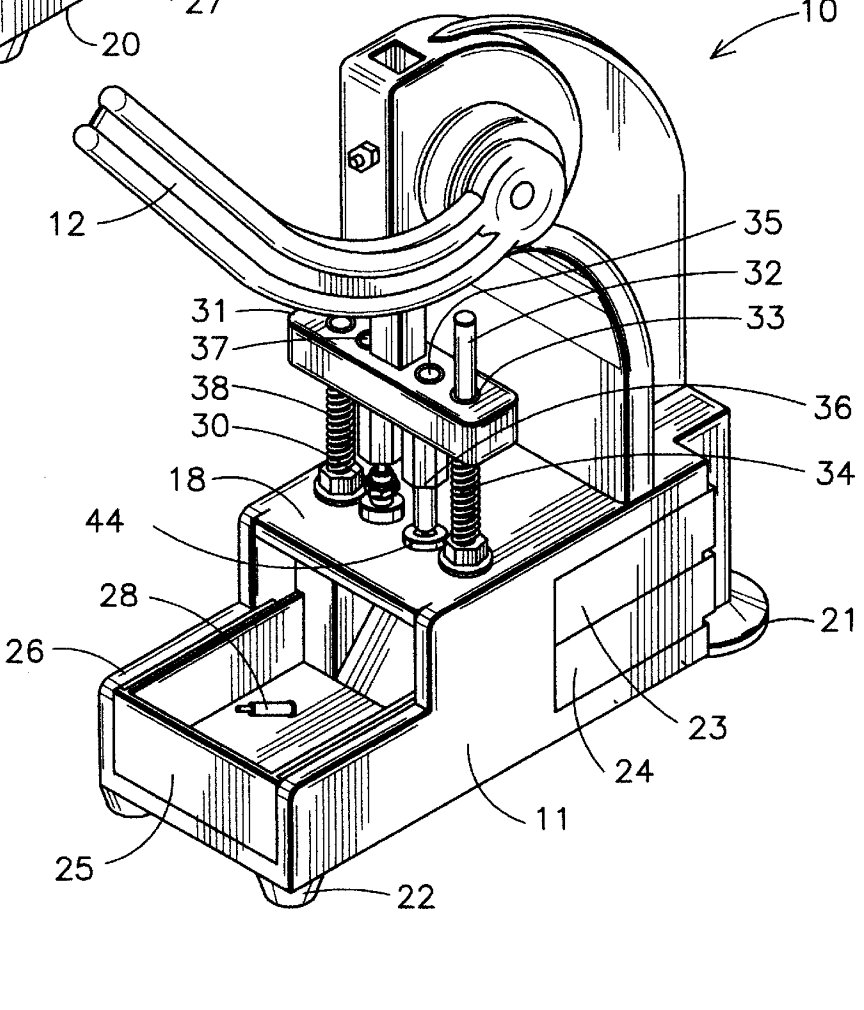
FIG. 2 is a perspective view of the dental handpiece of FIG. 1 in an actuated position.
Figure 6:
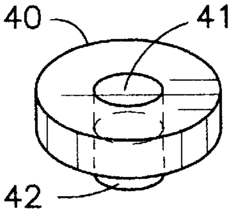
FIG. 6 is a perspective view of the bearing replacement plate for autochuck style turbines.
Figure 7:
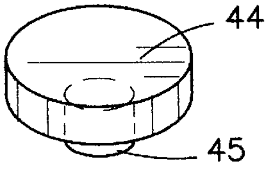
FIG. 7 is a perspective view of the bearing replacement plate for standard screw chuck style turbines.
Figure 8:
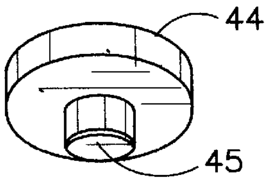
FIG. 8 is a bottom perspective view of the bearing replacement plate.
Figure 12:
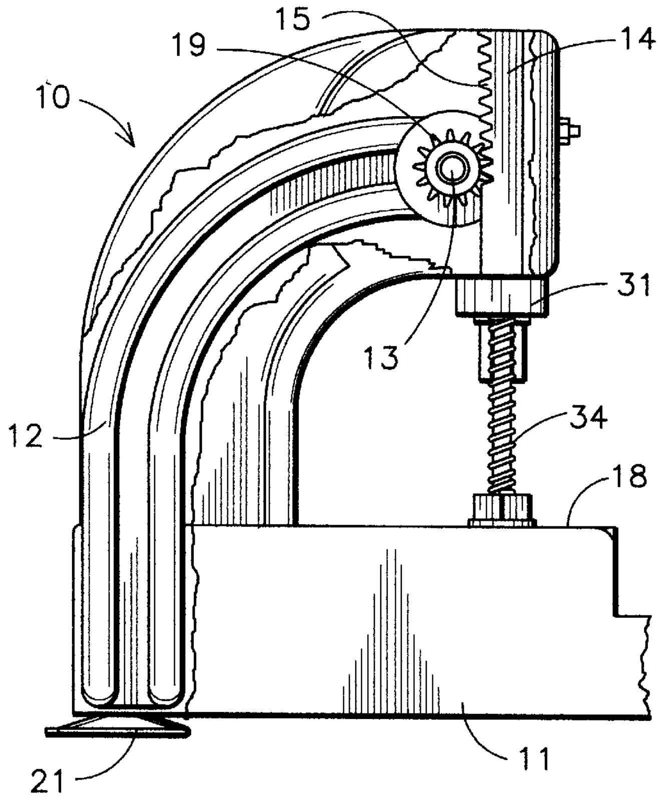
FIG. 12 is a side elevation of the press of FIGS. 1 having a portion thereof removed to show the actuation mechanism.
Figure 13:
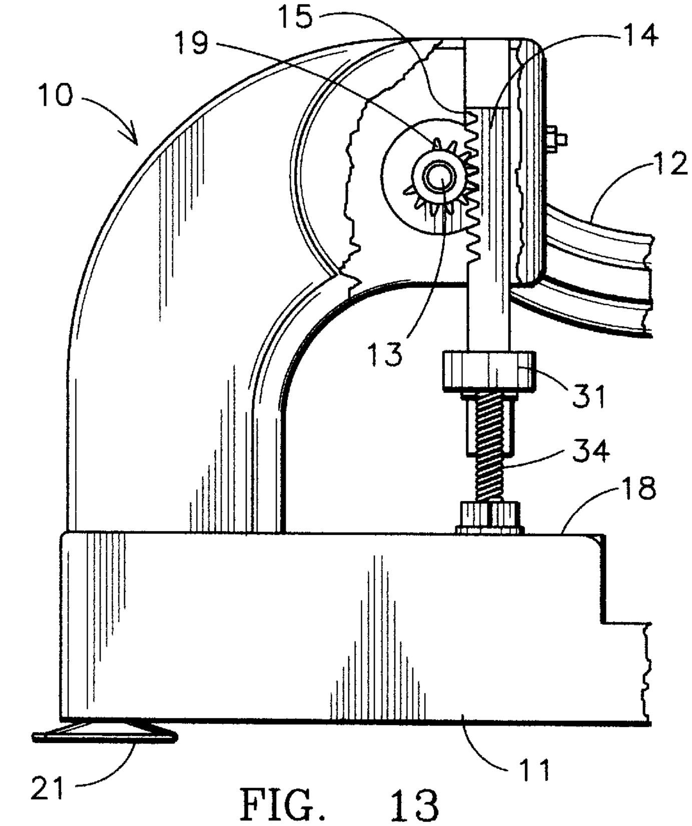
FIG. 13 is a side elevation of the press of FIGS. 2 having a portion thereof removed to show the actuation mechanism.

Referring to the drawings FIGS. 1 through 16 and especially to FIGS. 1 through 2, a press 10 for removing and installing dental handpiece components, such as bearings, is illustrated having a frame 11 and a driving arm 12 which passes through a shaft member 13 which in turn drives a rotating pinion gear 19 which drives the rack 14, teeth 15 to move the rack 14 up and down within the gear housing 16. The frame 11 has a base 18 and a bottom 20 having a pair of suction cups 21 mounted thereto and a pair of rubber feet 22 also mounted to the bottom 20 of frame 11. Frame 11 includes a pair of parts drawers 23 and 24 for holding new replacement parts for use in rebuilding a dental handpiece. The frame also has a removed parts container 25 slidably mounted between frame sides 26 which drawer 25 may have an angled back portion 27 therein. As seen in FIG. 2, a spindle member 28 removed from a dental handpiece turbine 30 has been captured in the container 25. The press includes a pusher plate 31 which is attached to the rack 14 at one end thereof. Rotating the handle 12 from the position shown in FIG. 1 to the position shown in FIG. 2 rotates the pinion gear 19 (FIGS. 12 and 13) which moves the rack 14 and the pusher plate 31 downwards towards the base 18. A pair of guide rods 32 are mounted to the base 18 and pass through the guide apertures 33 in the pusher plate 31. A compression spring 34 is mounted over each guide rod 32 between the pusher plate and the base 18 which springs are compressed when the plate 31 is pushed downward by rotating the handle 12. The compression springs bias the pusher plate away from the base. The threaded aperture 35 has a bearing ram 36 attached therein to the pusher plate 31. The bearing ram 36 is used to attach a new bearing to a dental handpiece turbine 30. A threaded aperture 37 has the spindle ram 38 attached thereto which spindle ram is utilized to remove a spindle from a dental handpiece turbine. In the base 18 is an aperture 70 for which a spindle removal bushing 69 is placed. A spindle removal bushing 40 has an aperture 41 passing therethrough. A bearing attachment bushing 44 is similar to the bushing 40 with an aperture 46 which allows for the attachment of two bearing replacement plates 40 & 44 (FIGS. 6, 7, 8). Plate 40 has an aperture designed to protect the chucking mechanism inside the spindle 28 on autochuck style handpieces during bearing replacement. Plate 44 is used on standard screw chuck style handpiece turbines. The extending portions 45 and 42 of the bearing replacement plates 44 and 40, respectively, are removably attached to the bearing attaching bushing 44 by sliding them 45 and 42 into the aperture 46.

Figure 3:
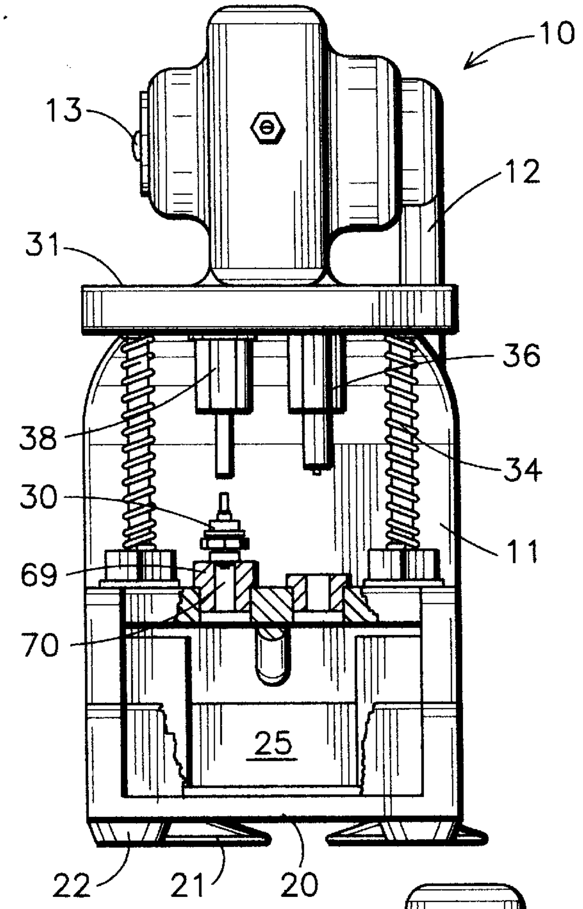
FIG. 3 is a front elevation of the press of FIGS. 1 having a dental handpiece turbine mounted in the spindle removal position.
Figure 4:
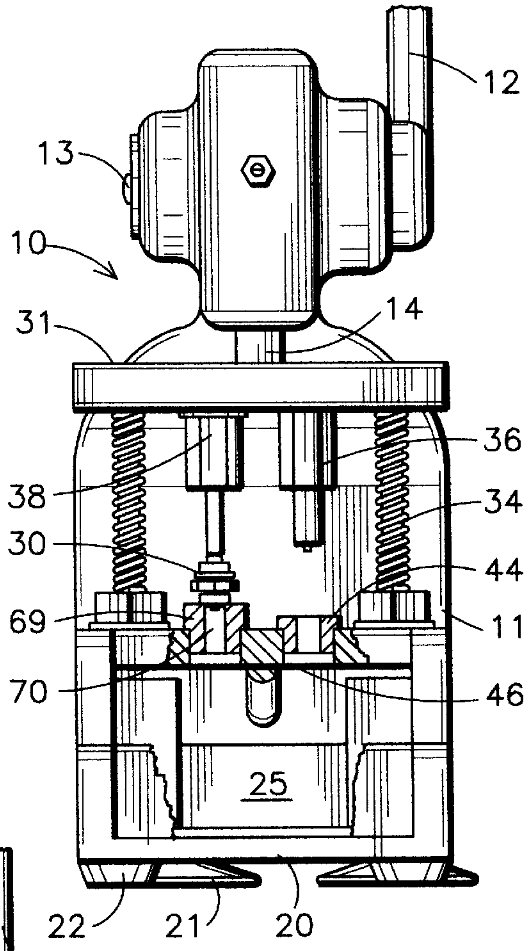
FIG. 4 is a front elevation of the press of FIG. 3 with press being actuated.
Figure 5:
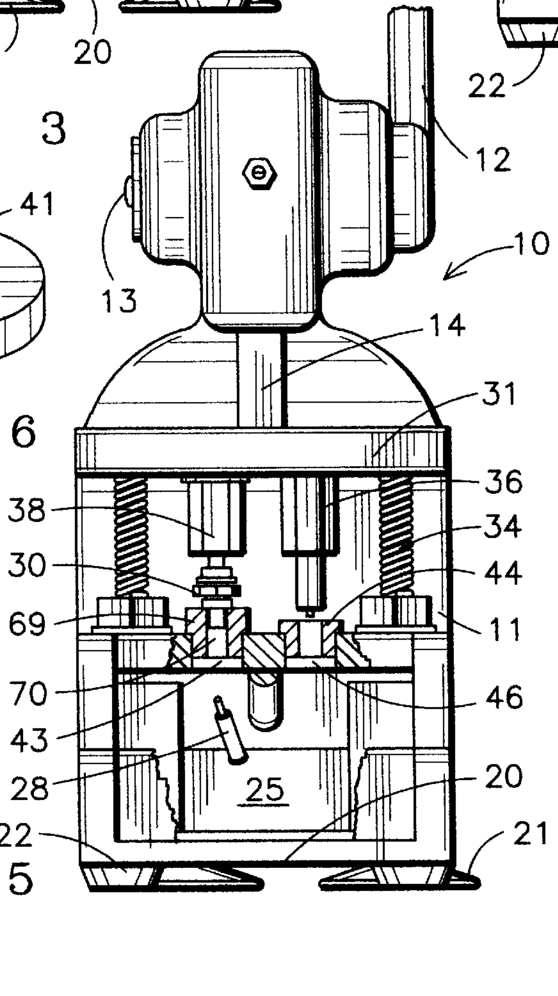
FIG. 5 is a front elevation of the press of FIGS. 3 and 4 having a dental handpiece turbine spindle being punched out of the bearings and into the collection tray.

As seen in FIGS. 3, 4, and 5, the sequence for the removal of a spindle 28 from a dental handpiece turbine 30 includes placing the turbine 30 onto the bushing 40 placed in the aperture 43. Placing chuck protection member 47, as more clearly illustrated in FIG. 15, having a rod portion 48 and a raised portion 50 with the raised portion 50 having an annular cupped area 51 therein for engaging the edge 52 of the spindle chuck assembly 53 with the turbine 30. The handle 12 is pulled around to rotate the shaft 13 to drive the rack 14 to push the pusher plate 31 towards the frame base 18 until the spindle ram 38 forces the spindle 28 from the turbine 30, as seen in FIG. 5, driving the turbine spindle 28 through the opening 70 against the angled surface 27 and into the collection container 25.

Figure 9:
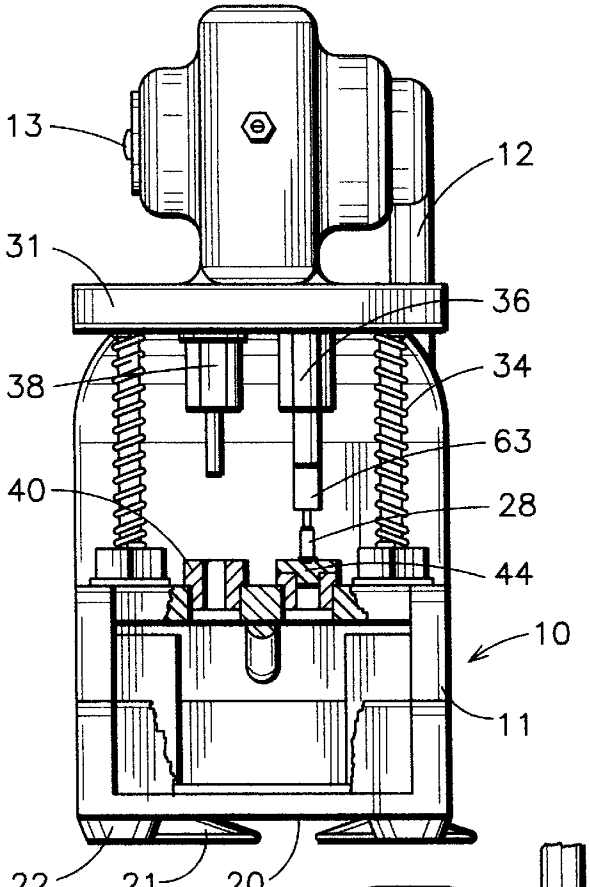
FIG. 9 is a front elevation of the press of FIGS. 1 having a spindle mounted in the bearing attaching position.
Figure 10:
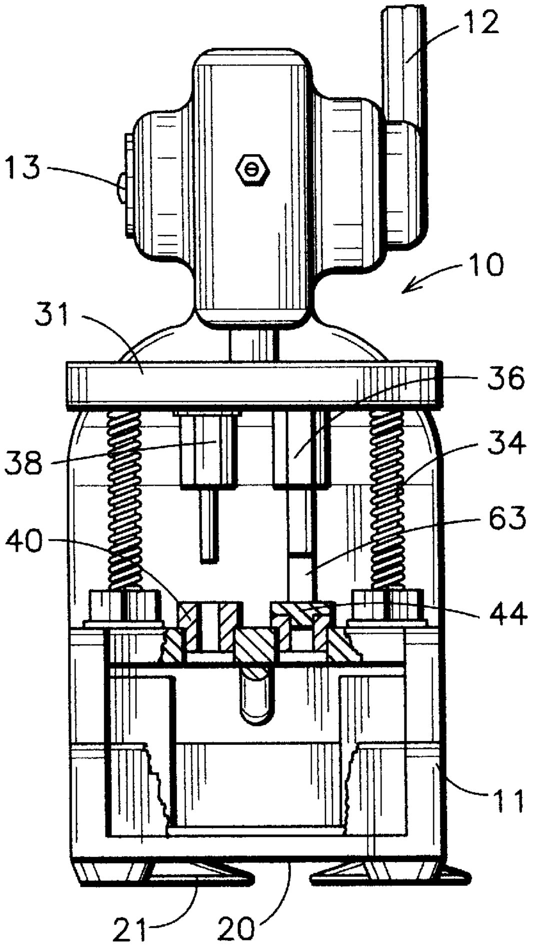
FIG. 10 is a front elevation of the press of FIG. 9 with press being actuated to drive the bearings onto a dental handpiece turbine spindle.
Figure 11:
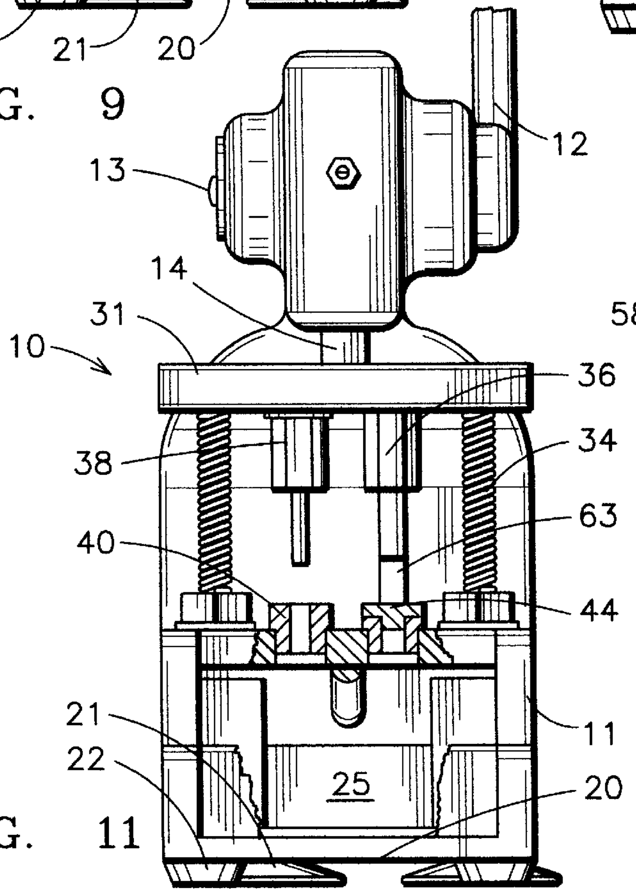
FIG. 11 is a front elevation of the press of FIGS. 9 and 10 having dental handpiece turbine bearings and impellers driven into the turbine spindle.

The new bearings can be removed from one of the drawers 23 and 24 and the original impeller taken from the base 18 and attached to the spindle 28, as illustrated in FIGS. 9, 10 and 11 piece by piece. The spindle 28 with the autochuck protection bur 47 installed are placed onto the bearing replacement plate 40 or 44. The new bearing 63 is mounted around the brass plunger 57 extruding out from inside of the bearing ram 36. The handle 12 is then rotated as in FIG. 9, thus pressing the new bearing down and onto the bottom of the spindle 28. At this point, the spindle 28 will be inside of the bearing ram 36, or as further demonstrated in FIG. 16. This process is repeated for each component part of the turbine until all parts are pressed on in the correct order, as in FIGS. 11 and 15.

Figure 16:
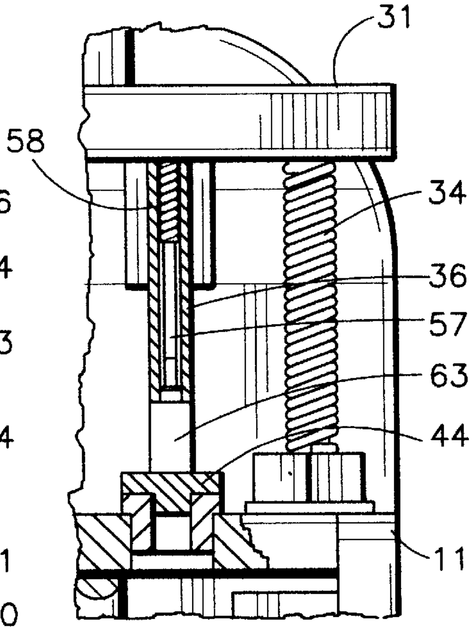
FIG. 16 is a sectional view taken through bearing ram.

The bearing ram 34, as seen in FIG. 16, is a hollow passageway 56 passing therethrough having a plunger 57 mounted therein and spring loaded with a spring 58. The plunger 57 allows the chuck to be positioned therein and to give against the force of the compression spring 58 when applying the new bearing to the turbine 30. This allows correct alignment of the new bearing and the spindle 28 while the new bearings are pressed on.

Figure 14:
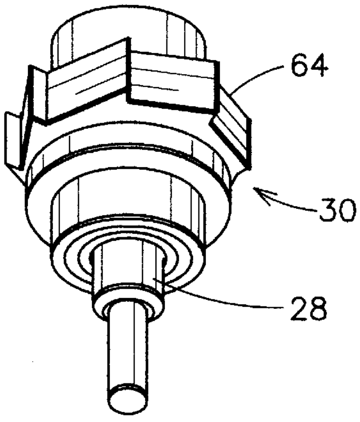
FIG. 14 is a perspective view of a dental handpiece turbine.
Figure 15:
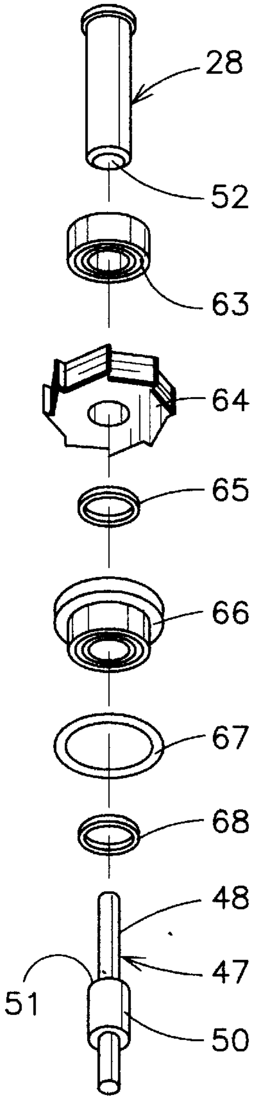
FIG. 15 is an exploded view of a dental handpiece turbine.

FIG. 14 illustrates the dental handpiece turbine having an impeller 64 and a spindle chuck assembly 61 while FIG. 15 illustrates an exploded view of the bearing assembly having the spindle chuck assembly 28 having the edge 52 and the bearing 63, impeller 64, the spacing washers 65, the flange bearings 66, O-rings 67 and a spacer washer 68. The chuck protection member 47 has the rod portion 48 and the raised portion 50 and has an annular cup portion 51.

The present dental press, as illustrated in FIGS. 1–16, eases the operation of the rebuilding of dental handpieces and the replacement of the bearings therein and provides a dental press with removable plates in a base for supporting the turbine. Spindle rams and bearing rams are driven with the press to remove the turbine spindle and to force or press-fit a new bearing into the turbine. The press advantageously has suction cups to hold it on a surface while it is being used as well as built-in storage for the new bearing parts and a collection container for catching the removed spindle.

It should be clear at this point, that a dental press has been provided which allows for the rapid removal and replacement of dental piece turbine bearings and sleeves. However, it should also be clear that the present invention is not to be considered as limited to the forms shown which are to be considered illustrative rather than restrictive.

I claim:

1. A press for removing and installing dental handpiece components comprising:

a press frame having a base for supporting a dental handpiece turbine thereon, said base having at least one aperture therethrough;

an actuation mechanism having a driving member and being supported on said frame for pushing against items placed in said press;

a push plate attached to said driving member of said actuation mechanism for movement toward said base responsive to operation of said actuation mechanism to move said push plate;

a spindle ram member attached to said push plate for removing a dental handpiece bearing;

a bearing ram member for attaching a bearing into a dental handpiece;

a dental handpiece turbine supporting member removably attached to said base over an aperture through said base, said turbine supporting member having an aperture therethrough sized for a dental handpiece turbine spindle to pass through; and a parts tray removeably supported on said frame below said base for catching a turbine spindle passing through said base aperture after being removed from a dental handpiece turbine, whereby a dental handpiece turbine bearing can be rapidly removed and replaced in press.

2. A press for removing and installing dental handpiece components in accordance with claim 1 in which said bearing ram has a hollow interior portion and has a spring loaded plunger mounted therein and protruding therefrom for supporting a bearing being attached to a dental handpiece turbine which allows correct alignment of the bearing and spindle during bearing replacement.

3. A press for removing and installing dental handpiece components in accordance with claim 1 in which said spindle ram has a separate turbine chuck protector mounted in the end thereof to protect the turbine chuck when removing a bearing from said turbine.

4. A press for removing and installing dental handpiece components in accordance with claim 3 in which said turbine chuck protector is removably mounted in the end of said spindle ram and the handpiece turbine spindle itself.

5. A press for removing and installing dental handpiece components in accordance with claim 4 in which said turbine chuck protector has a protruding rod having an annular raised portion having an annular cup formed on one end of said annular raised area.

6. A press for removing and installing dental handpiece components in accordance with claim 5 in which said turbine chuck protector is removably mounted in the end of said spindle ram.

7. A press for removing and installing dental handpiece components in accordance with claim 1 in which said press frame has a bottom portion and a plurality of suction cups attached to said bottom portion.

8. A press for removing and installing dental handpiece components in accordance with claim 7 in which said press frame has a parts drawer formed therein.

9. A press for removing and installing dental handpiece components in accordance with claim 8 in which said press frame has two drawers formed therein.

10. A press for removing and installing dental handpiece components in accordance with claim 6 in which said press frame base has two bearing replacement plates removably attached to an opening in said base for supporting a dental handpiece turbine for attaching a bearing thereto.

11. A press for removing and installing dental handpiece components in accordance with claim 1 in which said base has a pair of guide rods attached thereto and extending through guide openings in said push plate to guide said push plate when moved by said actuation mechanism.

12. A press for removing and installing dental handpiece components in accordance with claim 11 in which each of said pair of guide rods has a return spring mounted thereover to return said push plate to a starting position.

13. A press for removing and installing dental handpiece components in accordance with claim 1 in which said spindle ram has a threaded end portion for attachment to a threaded opening in said push plate.

14. A press for removing and installing dental handpiece components in accordance with claim 13 in which said bearing ram has a threaded end portion for attachment to a threaded opening in said push plate.

15. A press for removing and installing dental handpiece components in accordance with claim 1 in which said press is a hand operated press having an pull arm driving a gear rack onto said push plate.

16. A press for removing and installing dental handpiece components in accordance with claim 1 in which said parts tray has an angled surface for directing a removed turbine bearing into said tray.

* * * * *